US008493412B2

(12) United States Patent
Suddreth et al.

(10) Patent No.: US 8,493,412 B2
(45) Date of Patent: Jul. 23, 2013

(54) METHODS AND SYSTEMS FOR DISPLAYING SENSOR-BASED IMAGES OF AN EXTERNAL ENVIRONMENT

(75) Inventors: John G. Suddreth, Cave Creek, AZ (US); Thea L. Feyereisen, Hudson, WI (US)

(73) Assignee: Honeywell Internatioal Inc., Morristown, NJ (US)

( * ) Notice: Subject to any disclaimer, the term of this patent is extended or adjusted under 35 U.S.C. 154(b) by 1106 days.

(21) Appl. No.: 12/262,596

(22) Filed: Oct. 31, 2008

(65) Prior Publication Data

US 2010/0113149 A1      May 6, 2010

(51) Int. Cl.
  G09G 5/00   (2006.01)
  G01C 23/00  (2006.01)
  G05D 1/00   (2006.01)
  G05D 3/00   (2006.01)
  G06F 7/00   (2006.01)
  G06F 17/00  (2006.01)

(52) U.S. Cl.
  USPC .............................................. 345/633; 701/3

(58) Field of Classification Search
  None
  See application file for complete search history.

(56) References Cited

U.S. PATENT DOCUMENTS

| 6,327,522 | B1 * | 12/2001 | Kojima et al. ................ 701/1 |
| 7,379,014 | B1 * | 5/2008 | Woodell et al. ............. 342/29 |
| 2005/0007386 | A1 | 1/2005 | Berson et al. | |
| 2007/0018887 | A1 * | 1/2007 | Feyereisen et al. ......... 342/176 |
| 2008/0158256 | A1 * | 7/2008 | Russell et al. ............. 345/629 |
| 2008/0306680 | A1 * | 12/2008 | Marty et al. ............... 701/201 |

FOREIGN PATENT DOCUMENTS

| EP | 1936330 A1 | 6/2008 |
| EP | 1950532 A2 | 7/2008 |
| WO | WO2007/065781 A1 * | 6/2007 |

OTHER PUBLICATIONS

EP Search Report, EP 09174093.6 dated Feb. 23, 2010.
NASA Helps Clearing the Fog. Roland Piquepaille's Technology Trends (online). William B. Scott, Aug. 8, 2004 [retrieved on Oct. 27, 2008]. Retrieved from Internet: <URL: http://www.primidi.com/2004/08/21.html>.
Honeywell Integrated Primary Flight Display (IPFD) (online). Sep. 2006 [retrieved on Oct. 27, 2008]. Retrieved from Internet: <URL: http://www.honeywell.com/ipfd>.

* cited by examiner

*Primary Examiner* — Carlos Perromat
(74) *Attorney, Agent, or Firm* — Ingrassia Fisher & Lorenz, P.C.

(57) ABSTRACT

Embodiments include methods and apparatus for displaying images of an external environment, such as an external environment of an aircraft during flight. An embodiment of a display system includes an image sensor and a processing subsystem. The image sensor is adapted to produce sensed image data based on detected electromagnetic energy from a field of view of the external environment. The sensed image data registers within a first area of a display matrix, and the processing subsystem is adapted to identify a feature that registers within the first area. The processing subsystem is also adapted to determine parameters defining a second, smaller area of the display matrix that is positioned in proximity to the feature, and to generate a display signal to include information representing a sensor-based image corresponding to the sensed image data that registers within the second area.

25 Claims, 4 Drawing Sheets

METHODS AND SYSTEMS FOR DISPLAYING SENSOR-BASED IMAGES OF AN EXTERNAL ENVIRONMENT

TECHNICAL FIELD

The embodiments generally relate to methods and systems for displaying sensor-based images of an external environment, and more particularly to methods and systems implemented in an aircraft for displaying sensor-based images of an external environment on an aircraft-borne display device.

BACKGROUND

A Primary Flight Display is a computer-generated aircraft display that provides a flight crew with real-time visual representations of the operational states of their aircraft during flight. For example, a Primary Flight Display may display depictions of important flight instrumentation (e.g., altitude, attitude, heading, airspeed, and vertical speed indicators) and primary engine instrument indicators in a single, readily interpretable display. Some Primary Flight Displays also are adapted to display a forward-looking, synthetic view of the aircraft's external environment. The synthetic view may include depictions of terrain, runway indicators, and obstacle indicators, among other things. These synthetic depictions and indicators may be generated based on navigational data and terrain data, for example, which is stored in an on-board database. By displaying a synthetic view of the aircraft's external environment on the Primary Flight Display, the flight crew's situational awareness may be enhanced, and overall flight safety may be improved.

Although the synthetic imagery has its advantages, such imagery can not, by its nature, provide a completely accurate picture of the external environment. For example, although the synthetic image may include a runway indicator superimposed on a synthetic depiction of terrain, such a view would not provide the flight crew with information regarding potential obstacles on the runway or terrain features that are not represented in the terrain database. Accordingly, it is desirable to provide systems and methods with enhanced display of the external environment of an aircraft. Other desirable features and characteristics of the embodiments will become apparent from the subsequent detailed description of the inventive subject matter and the appended claims, taken in conjunction with the accompanying drawings and this background of the inventive subject matter.

BRIEF SUMMARY

An embodiment includes a method for displaying images of an external environment. The method includes the step of receiving sensed image data that represents detected electromagnetic energy from a field of view of the external environment, where the sensed image data registers within a first area of a display matrix. The method also includes the steps of identifying a feature that registers within the first area of the display matrix, determining parameters defining a second area of the display matrix, where the second area is positioned within and is smaller than the first area, and the second area is positioned in proximity to the feature, and generating a display signal to include information representing a sensor-based image corresponding to the sensed image data that registers within the second area of the display matrix.

Another embodiment includes a method for displaying images of an external environment of an aircraft during flight. The method includes the step of receiving sensed image data from an image sensor on board the aircraft, wherein the sensed image data represents detected electromagnetic energy from a field of view of the external environment of the aircraft, where the sensed image data registers within a first area of a display matrix. The method also includes the steps of identifying a feature that registers within the first area of the display matrix, determining parameters defining a second area of the display matrix, where the second area is positioned within and is smaller than the first area, and the second area is positioned in proximity to the feature, and generating a display signal to include information representing a sensor-based image corresponding to the sensed image data that registers within the second area of the display matrix.

Another embodiment includes a display system having an image sensor adapted to produce sensed image data based on detected electromagnetic energy from a field of view of an external environment, and a processing subsystem communicatively coupled with the image sensor. The processing subsystem is adapted to receive sensed image data that represents the detected electromagnetic energy, where the sensed image data registers within a first area of a display matrix, to identify a feature that registers within the first area of the display matrix, to determine parameters defining a second area of the display matrix, where the second area is positioned within and is smaller than the first area, and the second area is positioned in proximity to the feature, and to generate a display signal to include information representing a sensor-based image corresponding to the sensed image data that registers within the second area of the display matrix.

BRIEF DESCRIPTION OF THE DRAWINGS

The embodiments will hereinafter be described in conjunction with the following drawing figures, wherein like numerals denote like elements.

DETAILED DESCRIPTION

The following detailed description is merely representative in nature and is not intended to limit the inventive subject matter or the application and uses of the inventive subject matter. Furthermore, there is no intention to be bound by any theory presented in the preceding background or the following detailed description.

Embodiments include methods and systems for displaying sensor-based images of an external environment, and more particularly to methods and systems implemented in an aircraft for displaying sensor-based images of an environment external to the aircraft on an aircraft-borne display device. Although example embodiments described in detail below include methods and systems that are implemented in aircraft (e.g., powered airplanes, gliders, and helicopters), these example embodiments are not intended to limit the scope of the inventive subject matter to methods and systems that are implemented in aircraft. Instead, various alternate embodiments may be implemented in other types of systems and/or apparatus. For example, but not by way of limitation, embodiments may be implemented in other types of vehicles and vessels, including but not limited to spacecraft, unmanned mobile surveillance systems, motor vehicles, ships, submarines, and other land, airborne or seagoing vehicles and vessels. In addition, various alternate embodiments may be implemented in other types of systems and apparatus, including but not limited to binoculars, sight display systems (e.g., a gun or other weapon sight), and vision devices (e.g., head-mounted or helmet mounted display systems, such as night vision goggles, and so on). For simplicity, embodiments are described below with reference to "airplanes" or "aircraft," although it is to be understood that such references are not intended to limit the scope of the inventive subject matter.

Figure 1:
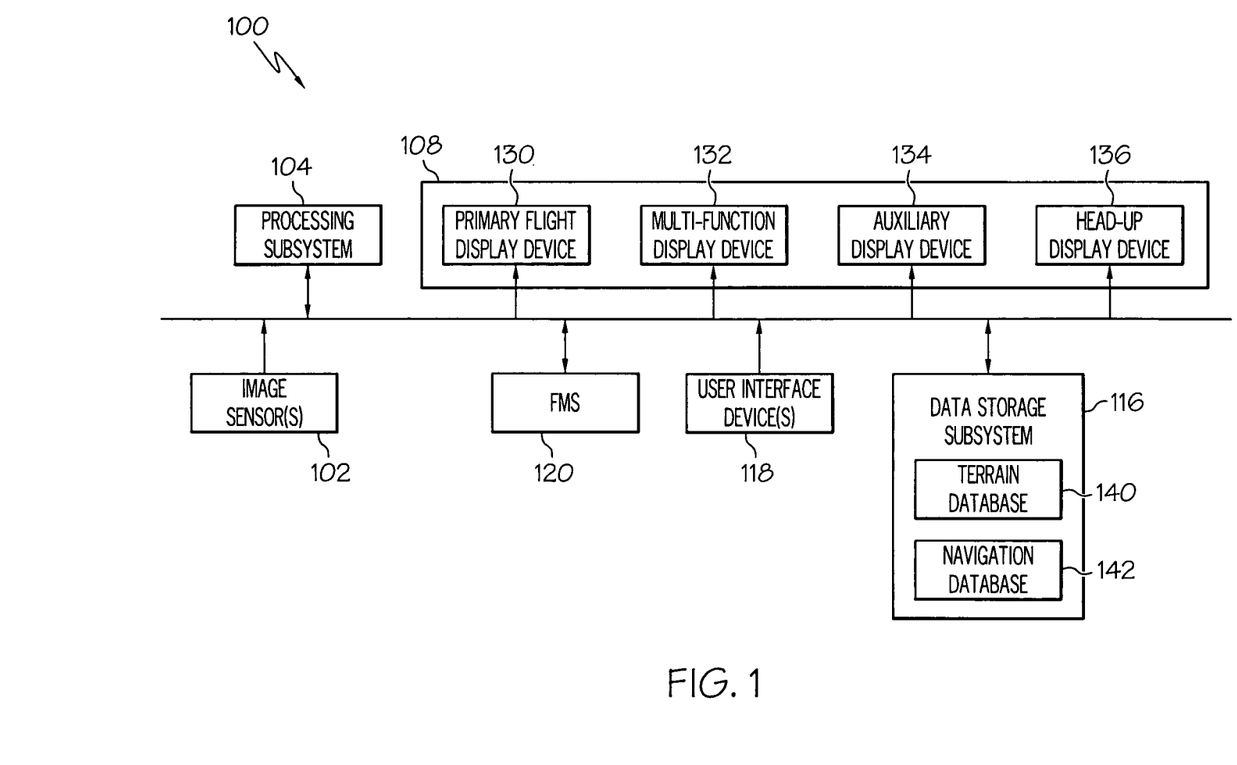
FIG. 1 is a simplified block diagram of a display system, in accordance with an example embodiment.

FIG. 1 is a simplified block diagram of a display system 100, according to an example embodiment. Display system 100 includes one or more image sensors 102, a processing subsystem 104, one or more display devices 108, a data storage subsystem 116, and one or more user interface devices 118, according to an embodiment. In a particular embodiment, display system 100 is implemented in an aircraft, and display system 100 further includes a flight management system 120 (FMS). The various components of display system 100 may be communicatively coupled via one or more communication busses as illustrated, in an embodiment, in order to exchange information between the various components. In alternate embodiments, the various components of display system 100 may be communicatively coupled using different arrangements from that depicted in FIG. 1. In an embodiment, image sensors 102, processing subsystem 104, and display devices 108 are co-located (e.g., within an aircraft). In other embodiments, image sensors 102, processing subsystem 104, and/or display devices 108 may be remotely located from each other. Accordingly, display system 100 may include various communication apparatus (not illustrated) adapted to facilitate communication of data between image processing sensors 102, processing subsystem 104, and display devices 108.

Each of the one or more image sensors 102 is adapted to detect electromagnetic energy from a field of view of an external environment, and to produce sensed image data based on the detected electromagnetic energy. For example, but not by way of limitation, image sensors 102 may include, but are not limited to, any one or more sensors selected from a group of sensors that includes visible radiation sensing cameras (e.g., still cameras or video cameras), electro-optical devices, infrared radiation sensors (e.g., night vision sensors), ultraviolet light sensors, light detection and ranging (LIDAR) devices, and radar devices (e.g., millimeter wave radar, microwave radar, and/or radio frequency wave radar), to name a few.

Processing subsystem 104 includes one or more co-located or communicatively coupled general purpose or special purpose microprocessors and associated memory devices and other electronic components, in an embodiment. Processing subsystem 104 is adapted to receive the sensed image data produced by image sensors 102, and to generate a display signal, which includes information representing the sensed image data ("sensed image information") and the positioning of images represented by the sensed image information. Processing subsystem 104 also is adapted to identify one or more features which, when displayed, would coincide with the field of view of the image sensor 102. According to an embodiment, processing subsystem 104 may generate the sensed image information so that sensor-based images are prominently displayed in proximity to those features, and either excluded or displayed less-prominently elsewhere. As used herein, the term "in proximity to" may be defined as partially or completely encompassing or adjacent to.

In addition to generating the sensed image information for inclusion in the display signal, processing subsystem 104 may generate the display signal also to include information representing a synthetic image of the external environment, one or more instrumentation indicators (e.g., attitude indicator, altitude indicator, heading indicator, airspeed indicator, glideslope scale), and/or one or more symbols (e.g., a flight path vector symbol, target symbol, waypoint symbol, obstacle symbol, runway symbol, extended runway centerline symbol, attitude indicator symbol, and/or zero pitch reference line or horizon line). The synthetic image information, the instrumentation indicator information, and/or the symbol information included within the display signal may be generated based on flight management information (e.g., from FMS 120), navigation and control information (e.g., from the navigation system of FMS 120), and/or terrain information (e.g., from data storage subsystem 116), for example. In an embodiment, the synthetic image, the sensor-based images, the instrumentation indicators, and/or the symbols may be displayed on various layers of the display, as will be described in more detail later.

Data storage subsystem 116 includes one or more memory devices (e.g., random access memory (RAM), read only memory (ROM), removable data storage media and associated interfaces, and/or other types of memory devices. In an embodiment, data storage subsystem 116 includes a terrain database 140 and a navigation database 142, among other things. The terrain database 140 may include locations and elevations of natural terrain features and obstacles (e.g., mountains or other earth surface features) and man-made obstacles (e.g., radio antenna towers, buildings, bridges). Terrain data stored in terrain database 140 may be received from external, up-linked sources and/or from onboard devices (e.g., a Forward Looking Infrared (FLIR) sensor and/or active or passive type radar devices) that sense and map man-made obstacles. The navigation database 142 may include, for example, data defining the actual geographical boundaries of airports, runways, taxiways, airspaces, and geographic regions, among other things.

Display devices 108 may form a portion of an electronic flight instrument system (EFIS). Each of display devices 108 may include a graphics display generator (not illustrated) and an output device adapted to present information for visual perception on a display surface, where the information presented corresponds to the display signals received from processing subsystem 104. More particularly, display devices 108 are adapted to display a sensor-based image represented by the sensed image information in the display signal. When the display signal also includes synthetic image, instrumentation indicator, and/or symbol information, display devices 108 also may display the synthetic image, the instrumentation indicators, and/or the symbols. Display devices 108 may include one or more cathode ray tubes (CRT), liquid crystal displays (LCD), light emitting diode (LED) displays, flat panel displays, front or rear projector devices (e.g., video projectors, LCD projectors, laser projectors, and head-up displays), head-mounted or helmet-mounted displays (e.g., near-to-eye displays), and three-dimensional displays. Depending on the type of display device 108, the display surface may include a pixel array, a fluorescent screen, a projection screen, a combiner (e.g., for a head-up display), a transparent display panel, or another type of surface.

When system 100 is implemented in an aircraft, display devices 108 may include one or more display devices selected from a group of display devices that includes a primary flight display device 130, a multi-function display device 132, an auxiliary display device 134, a head-up display device 136, and a near-to-eye display device (not illustrated). In an alternate embodiment, system 100 may be implemented in a system in which image sensors 102 and/or processing subsystem 104 are remote from display device 108 (e.g., an unmanned mobile or stationary surveillance system). In such an embodiment, display device 108 may include a computer monitor, for example, which is communicatively coupled over a wired or wireless connection (e.g., the Internet or a wireless network) with the image sensors 102 and/or processing subsystem 104. In still other alternate embodiments, other types of display devices 108 may be included within system 100.

FMS 120 is a computerized avionics component adapted to provide real-time lateral navigation information and to calculate performance data and predicted vertical profiles, among other functions. FMS 120 may include, for example, a flight management computer, an autopilot or auto flight system, and a navigation system. The navigation system may, in turn, include a Global Positioning System (GPS) receiver and an inertial reference system (IRS) or attitude heading and reference system (AHRS), which enable the navigation system to determine the aircraft's current position, attitude, and heading.

User interface devices 118 may include, for example, one or more keyboards, cursor control devices, touchscreens associated with one or more of display devices 108, and/or other types of user interface devices. As will be described in more detail later, user interface devices 118 may enable a user to affect how sensor-based images and/or other displayed information is displayed.

Figure 2:
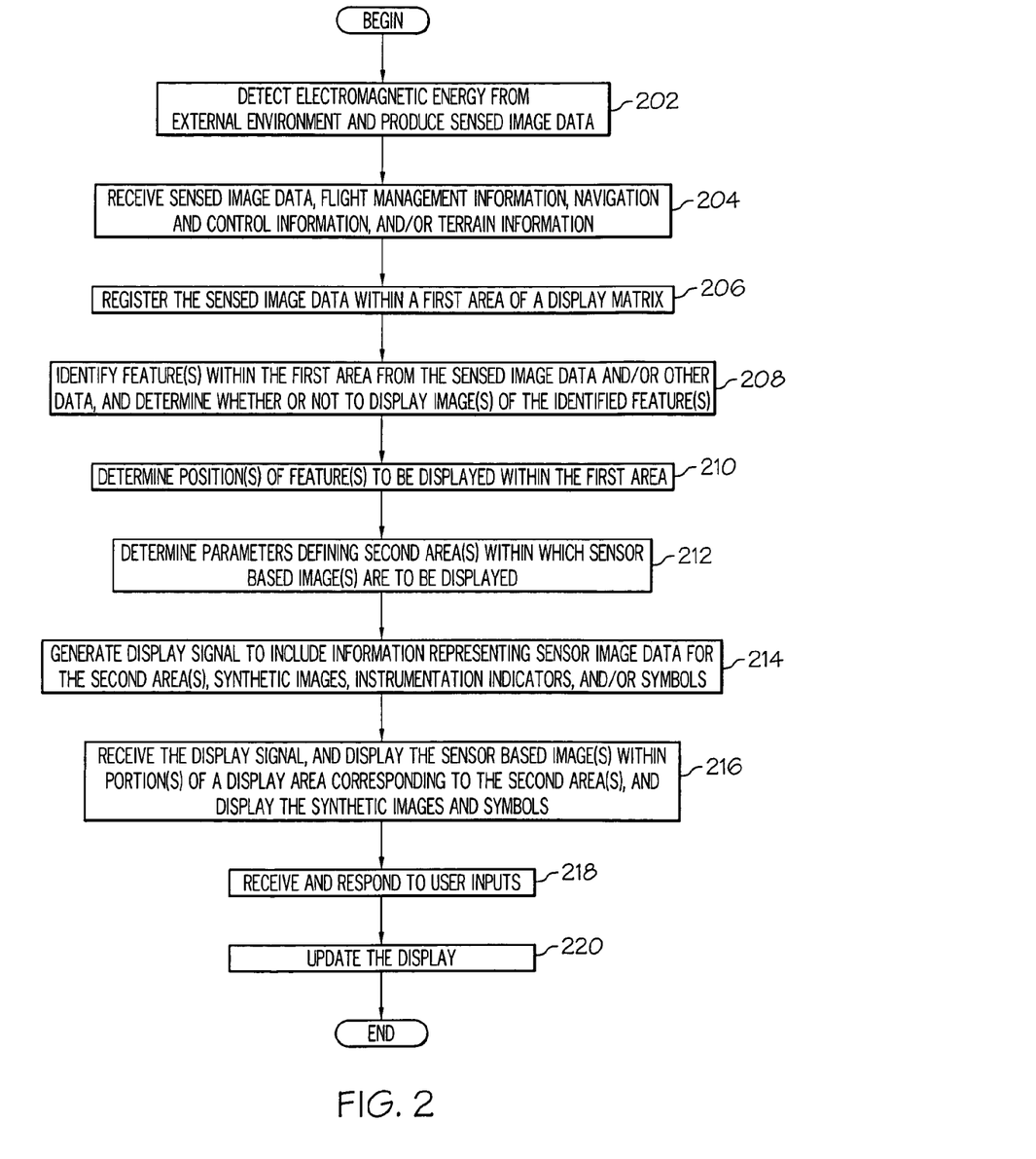
FIG. 2 is a flowchart of a method for displaying images of an external environment, in accordance with an example embodiment.

FIG. 2 is a flowchart of a method for displaying sensor-based images of an external environment, in accordance with an example embodiment. The embodiments described below pertain to displaying images of an external environment on a primary flight display device of an aircraft. Once again, it is to be understood that the below-described embodiments are not to be considered as limiting implementation of various embodiments to an aircraft system and/or to displaying information on a primary flight display.

The method may begin, in block 202, when an image sensor (e.g., image sensor 102, FIG. 1) detects electromagnetic energy from within a field of view of an external environment, and the image sensor produces sensed image data from the detected electromagnetic energy. As discussed previously, image sensors may include any one or more of visible radiation sensing cameras, electro-optical devices, infrared radiation sensors, ultraviolet light sensors, LIDAR devices, and radar devices. Accordingly, the sensed image data may include various types of data produced by such devices.

In block 204, the sensed image data may be received (e.g., by processing subsystem 104, FIG. 1) from one or more of the image sensors. In addition, flight management information, navigation and control information, and/or terrain information may be received from the FMS (e.g., FMS 120, FIG. 1) and/or a database (e.g., terrain database 140 and/or navigation database 142, FIG. 1). According to an embodiment, positions of the sensor-based and synthetic images, instrumentation indicators, and symbols for a given display screen are determined (e.g., by processing subsystem 104, FIG. 1), and those positions are conveyed to a display device in a display signal, along with information representing the images, indicators, and symbols to be displayed (e.g., the content).

Figure 3:
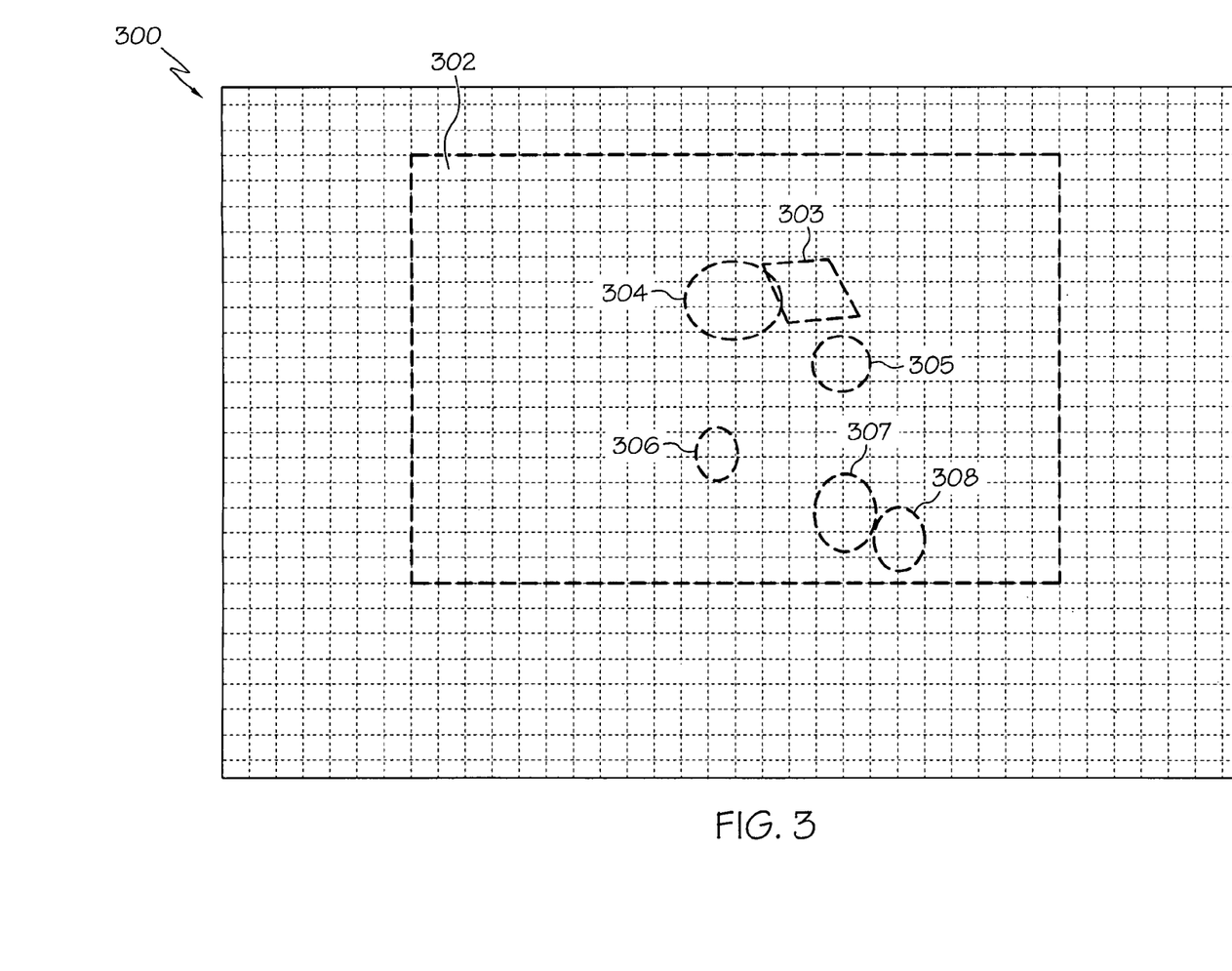
FIG. 3 depicts a conceptual diagram of an example of a display matrix, in accordance with an example embodiment.

In an embodiment, the field of view of the sensed image data may partially or completely coincide with the field of view of the synthetic image, and a display matrix may be utilized in order to register the relative and/or actual orientations and positions of the sensor-based images, the synthetic images, the instrumentation indicators, and the symbols to be displayed. In an embodiment, in block 206, the sensed image data may be registered within a first area of a display matrix. FIG. 3 depicts a conceptual diagram of an example of a display matrix 300, in accordance with an example embodiment. Display matrix 300 includes a two-dimensional array of rows and columns, indicated by dashed horizontal and vertical lines, to which portions of sensor-based images, synthetic images, instrumentation indicators, and/or symbols may be mapped or registered (e.g., e.g., by processing subsystem 104, FIG. 1). Essentially, display matrix 300 is a construct that enables a processing subsystem to determine and identify positions (e.g., pixels) at which each small segment of a sensor-based image, a synthetic image, an instrumentation indicator, and/or a symbol should be displayed on a display surface.

The field of view of the external environment from which an image sensor detects electromagnetic energy may have a variety of two-dimensional shapes. For example, the field of view may have a generally rectangular shape, in an embodiment, although the field of view may have circular, oval or other shapes, in other embodiments. In an embodiment in which the field of view has a rectangular shape, sensed image data may be registered to a rectangular, first area 302 of display matrix 300, which area is indicated by a dashed box. In an embodiment, such as when the direction, relative to the aircraft's heading, from which the sensor detects electromagnetic energy is fixed (e.g., the sensor is a fixed, forward looking sensor), the first area 302 of the display matrix 300 to which the sensed image data is registered may be pre-defined and thus set in its position within display matrix 300. In an alternate embodiment, such as when the direction from which the sensor detects electromagnetic energy may change, the first area 302 of the display matrix 300 to which the sensed image data is registered may be located in different positions within the display matrix 300.

Referring back to FIG. 2, in block 208, one or more features may be identified (e.g., by processing subsystem 104, FIG. 1), which are present within the field of view of an image sensor and/or which coincide with the first area of the display matrix. This identification may be made, for example, by analyzing the sensed image data and/or other data (e.g., flight management information, navigation and control information, and/or terrain information) to determine objects in the external environment that may be of interest to the flight crew based on the then-current phase of flight. For example, when the aircraft is established on approach (e.g., using an instrument landing system), objects of potential interest to the flight crew include at least the runway and any known or detected potential obstacles within the aircraft's flight path. Generally, features of potential interest may include, for example but not by way of limitation, navigational features (e.g., an airport, a runway, a taxiway, and a waypoint), a known terrain feature (e.g., a geographical feature or an obstacle as defined in the terrain database 140, FIG. 1), a symbol (e.g., a flight path vector symbol, a runway symbol, an extended runway center line symbol), and a detected anomaly (e.g., an obstacle or other object detected by analyzing data produced by an image sensor).

According to an embodiment, one method of identifying a feature includes performing one or more image processing algorithms using the sensed image data to determine whether a detected anomaly is present within the field of view of the image sensor from which the sensed image data originated. A detected anomaly may include, for example but not by way of limitation, a cloud, an area having an unusually high temperature (a "hotspot"), and a potential obstacle. Accordingly, the image processing algorithms may include, for example, algorithms adapted to analyze radar data (e.g., millimeter wave radar data) for the purpose of detecting clouds, algorithms adapted to analyze infrared data for the purpose of detecting objects having temperatures outside of a given temperature range (e.g., exhaust clouds from motor vehicles or aircraft), algorithms adapted to analyze sensed image data to detect objects having heights that exceed a threshold (e.g., obstacle detection), and algorithms adapted to analyze sensed image data to detect movement of an object (e.g., another aircraft, a motor vehicle, or a pedestrian).

As mentioned above, features may include other objects of interest besides detected anomalies. Accordingly, data other than sensed image data may be analyzed to determine whether a feature of potential interest is present. These other features of potential interest have positions that may coincide with the field of view of the image sensor or the first area of the display matrix. For example, in an embodiment, the sensed image data may be compared with synthetic image data corresponding to overlapping areas within the field of view. Differences between the sensed image data and the synthetic image data may be identified as features. In another embodiment, navigational data (e.g., from navigation database 142, FIG. 1) may be analyzed to determine whether an airport, a runway, a taxiway or a waypoint are present within the field of view. In another embodiment, terrain data (e.g., from terrain database 140, FIG. 1) may be analyzed to determine whether a known terrain feature (e.g., a geographical feature or a potential obstacle) is present within the field of view. In yet another embodiment, navigational data and information regarding the aircraft's current position, altitude, attitude, and/or heading (e.g., from FMS 120, FIG. 1) may be analyzed to determine whether a symbol (e.g., a flight path vector symbol, a runway symbol, an extended runway center line symbol) register within the first area of the display matrix (e.g., first area 302, FIG. 3).

In an embodiment, when a feature is determined to be present, a further determination may be made whether a sensor-based image of the feature is to be displayed or excluded from the display. This determination may include, for example, determining whether the feature is within a pre-defined linear distance from the aircraft, determining whether the feature is within a pre-defined angular or linear distance from the aircraft's flight path, or determining whether the feature is present on a runway or taxiway, for example. In addition, during various phases of flight, images of some types of features (e.g., clouds) may intentionally be excluded from the display. In another embodiment, images of all features identified within or coinciding with the field of view of the first area of the display matrix may be displayed.

After identifying one or more features, positions of the features within the first area of the display matrix may be determined, in block 210. A determination of a position of a feature may include determining a reference point for the feature and/or determining boundaries of the feature, where the reference point and/or boundaries register within a particular position within the first area.

In block 212, parameters may be determined which define a second area for each sensor-based image that is to be displayed (e.g., for each identified feature for which a position has been determined). In an embodiment, the parameters may be determined to define the second area as encompassing boundaries of the feature, where the boundaries may be known boundaries (e.g., known geographical boundaries of the edges of a runway) or detected boundaries (e.g., detected boundaries of an obstacle), and the parameters are determined to represent the boundaries from the perspective of the aircraft as registered within the first area of the display matrix. In another embodiment, the parameters may be determined to define the second area to include an area within a defined number of measurement units from one or more reference points associated with the feature. In yet another embodiment, the parameters may be determined to define the second area to include an area that encompasses boundaries of the feature and an additional area extending a defined number of measurement units beyond the area that encompasses boundaries of the feature. The measurement units may be linear, angular or other measurement units, and may be referenced to the feature itself or to the display matrix. For example, when a runway is identified as a feature, the parameters may define a second area as encompassing the edges of the runway plus an area extending 100 meters in all directions from the edges of the runway on the surface of the terrain. Alternatively, for example, when a flight path vector symbol is identified as a feature, the parameters may define a second area as encompassing edges of the flight path vector symbol plus an area extending one centimeter in all directions from the edges of the flight path vector symbol on the display matrix.

Referring again to FIG. 3, for example, a processing subsystem may have determined parameters defining one or more second areas 303, 304, 305, 306, 307, 308 (indicated by dotted perimeter lines) of the display matrix 300, which are positioned in proximity to various identified features. In an embodiment, each second area 303-308 is positioned within and is smaller than the first area 302, and the parameters are determined to define each second area 303-308 as at least encompassing boundaries of a feature. Second area 303 may correspond to an area encompassing a runway, second area 304 may correspond to an area encompassing a symbol, such as a flight path vector symbol, and second areas 305-308 may correspond to an area encompassing a navigational feature, a known geographical feature, or a detected anomaly (e.g., a building, a tower, a hotspot or another type of feature).

Referring back to FIG. 2, in block 214, a display signal may be generated that includes information representing the sensor image data for the second areas and the locations of the second areas. In addition, in an embodiment, the display signal may be generated to include information representing synthetic images and/or symbols. In block 216, the display signal may be received (e.g., by a display device 108, FIG. 1), and the sensor-based images represented in the display signal may be displayed within portions of the display area corresponding to the second areas of the display matrix. In addition, the synthetic image, instrumentation indicators, and/or symbols represented in the display signal also and simultaneously may be displayed within portions of the display area corresponding to the first area of the display matrix or within other areas of the display matrix.

In an embodiment, the synthetic image may be displayed on a first layer of the display, the sensor-based images may be displayed on a higher, second layer as a semi-transparent or opaque overlay on the synthetic image, and the instrumentation indicators and/or symbols may be displayed on a higher still, third layer as opaque overlays of the synthetic and sensor-based images. In other embodiments, the synthetic image, the sensor-based image, the instrumentation indicators, and/or the symbols may be displayed on different layers from those described in the preceding sentence. Alternatively, the sensor-based images and the synthetic image may be registered to non-overlapping portions of the first area of the display matrix, and thus the sensor-based images technically may not be considered an overlay of the synthetic image. In still other embodiments, only one or more, but not all of the synthetic image, the sensor-based images, the instrumentation indicators, and/or the symbols may be displayed. For example, in a particular embodiment, only the sensor-based images may be displayed.

In an embodiment, displaying a sensor-based image includes initially (e.g., for a time period of about 1-5 seconds) displaying the sensor-based image using initial image display characteristics that are adapted to draw attention of a viewer of the display device to the second area. Subsequently the sensor-based image may be displayed using steady-state image display characteristics. For example, but not by way of limitation, initial image display characteristics may include displaying a sensor-based image with an intensity or contrast that is higher than the intensity or contrast of the underlying synthetic image and/or other sensor-based images that already are being displayed. Alternatively, initial image display characteristics may include pulsing the display of the sensor-based image on and off, displaying a prominent border around the sensor-based image, or displaying the sensor-based image with a color filter (e.g., red). After the initial period of time has elapsed, the sensor-based image may be displayed using steady-state image display characteristics, which may include colors and contrasts that are consistent with the synthetic image and other displayed sensor-based images.

In block 218, the system may receive and respond to user inputs (e.g., received via user input devices 118, FIG. 1) which indicate that a user (e.g., a member of the flight crew) wishes to affect or change characteristics of the sensor-based images being displayed. For example, but not by way of limitation, the system may be adapted to provide a user with the ability to select and delete particular sensor-based images, to increase or decrease the size of a second area within which a particular sensor-based image is displayed, and/or to increase or decrease the transparency or contrast of a particular sensor-based image, among other things.

In block 220, the system continues to update the display by generating new display signals that are based on new sensed image data, flight management information, navigation and control information, and/or terrain information. This updating process may continue for each particular displayed image, instrumentation indicator, and symbol until the displayed image, instrumentation indicator or symbol becomes obsolete. For example, a particular feature for which a sensor-based image is being displayed may move outside of the first area of the display matrix, and thus a sensor-based image for the feature will no longer be displayed. Alternatively, the aircraft may enter a different phase of flight for which a particular image, instrumentation indicator or symbol is no longer relevant. Eventually, such as when a flight is terminated or the system is powered off or deactivated, the method may end.

Figure 4:
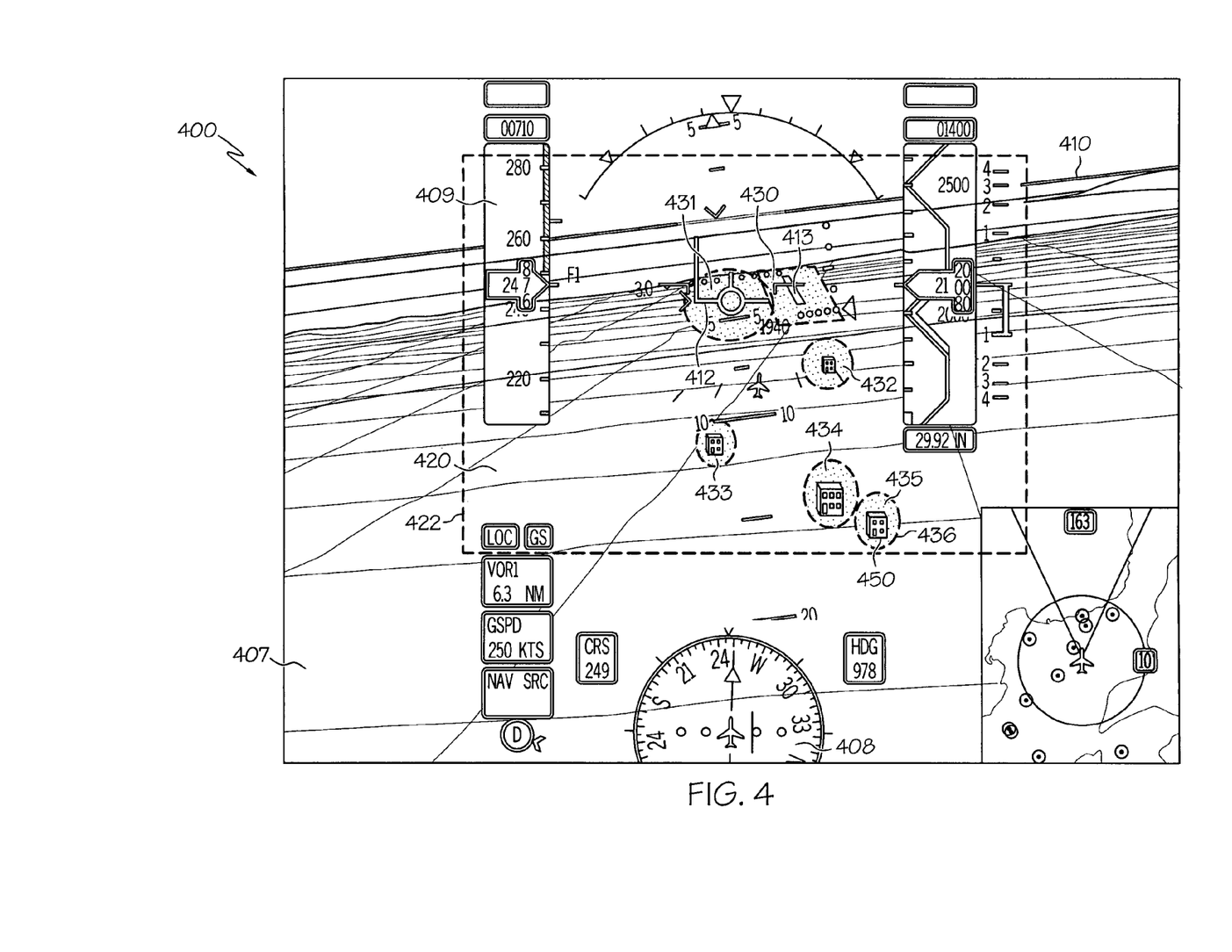
FIG. 4 depicts an example of a display screen that may be rendered by the display system of FIG. 1, in accordance with an example embodiment.

FIG. 4 depicts an example of a display screen 400 that may be rendered on a display surface by a display device (e.g., display device 108, FIG. 1) of the display system of FIG. 1, in accordance with an example embodiment. The particular example display screen 400 depicted in FIG. 4 may correspond to a display screen rendered by a primary flight display device (e.g., primary flight display device 130, FIG. 1) of an aircraft, for example, although a display screen may be rendered by other types of display devices, as discussed previously. Using the primary flight display device example, however, display screen 400 may include one or more sensor-based images 401, 402, 403, 404, 405, 406, a synthetic image 407, various instrumentation indicators 408, 409, 410, and various symbols 412, 413.

Synthetic image 407 may be displayed across substantially all of the display screen 400 on a lower layer of the display, in an embodiment. In an alternate embodiment, synthetic image 407 may be displayed only within portions of the display screen 400. Instrumentation indicators 408-410 and symbols 412, 413 may be displayed on a higher or highest layer of the display, in an embodiment. In the illustrated example, the instrumentation indicators 408-410 include a heading indicator 408, an altimeter 409, and an attitude and horizon indicator 410, among other things. The symbols 412, 413 include a flight path vector symbol 412, and a runway symbol 413. In alternate embodiments, more, fewer or different instrumentation indicators and/or symbols may be displayed.

Sensor-based images 401-406 are displayed within a first area 420 of the display screen 400 that corresponds to a first area of a display matrix (e.g., first area 302, FIG. 3) or to the field of view of the image sensor (e.g., image sensor 102, FIG. 1) from which sensed image data corresponding to the sensor-based images 401-406 originated. Sensor-based images 401-406 may be displayed on a layer of the display between the layer in which synthetic image 407 is displayed and the layer in which instrumentation indicators 408-410 and/or symbols 412, 413 are displayed. Boundaries of the first area 420 are indicated by a dashed box 422, which box in actuality may not be displayed. More accurately, sensor-based images 401-406 are displayed within second areas 430, 431, 432, 433, 434, 435 of the display screen 400, which are positioned within and smaller than the first area 420. Boundaries of the second areas 430-435 are indicated by dotted perimeter lines (e.g., perimeter line 436), which lines also may not be displayed, in actuality. The second areas 430-435 represent portions of the display surface that correspond with the second areas of the display matrix (e.g., second areas 303-308, FIG. 3), which encompass features identified by the processing subsystem. More particularly, second area 430 encompasses runway symbol 413, second area 431 encompasses a flight path vector symbol 412, and second areas 432-435 encompasses images of obstacles (i.e., building 450) detected from the sensed image data. As mentioned above, and as FIG. 4 illustrates, sensor-based images 401-406 are displayed only within second areas 430-435, and not within the entire first area 420, even though sensed image data may have been available to the processing subsystem for the entire first area.

Sensor-based images inherently include more visual information than synthetic images, and accordingly a sensor-based image may provide a user with important information that is not available in a synthetic image. However, by virtue of its increased visual complexity, a sensor-based image may take more time for a user to interpret than an equal-sized portion of a synthetic image. Accordingly, it may not be desirable to display a sensor-based image across an entire first area of a display screen (e.g., first area 420, FIG. 4). By selectively displaying sensor-based images in areas proximate to features of interest, rather than across an entire first area, the area within which sensor-based images are displayed is reduced. Accordingly, the user's attention to features of interest is enhanced, and the time for the user to interpret the areas of the display within which sensor-based images are displayed may be reduced.

Embodiments of methods and systems for displaying images of an external environment have now been described. The various embodiments described above have been described herein in terms of functional block components and various processing steps. It should be appreciated that such functional blocks may be realized by any number of hardware, firmware, and/or software components configured to perform the specified functions. While at least one exemplary embodiment has been presented in the foregoing detailed description of the inventive subject matter, it should be appreciated that a vast number of variations exist. It should also be appreciated that the exemplary embodiment or exemplary embodiments are only examples, and are not intended to limit the scope, applicability, or configuration of the embodiments in any way. Rather, the foregoing detailed description will provide those skilled in the art with a convenient road map for implementing an exemplary embodiment. It being understood that various changes may be made in the function and arrangement of elements described in an exemplary embodiment without departing from the scope of the inventive subject matter as set forth in the appended claims.

What is claimed is:

1. A method for displaying images of an external environment, the method comprising the steps of:
   receiving sensed image data that represents detected electromagnetic energy from a field of view of the external environment, wherein the sensed image data registers within a first area of a display matrix;
   identifying a feature that registers within the first area of the display matrix based on feature data that is associated with a particular phase of flight;
   determining parameters defining a second area of the display matrix, wherein the second area is positioned within and is smaller than the first area, and the second area is positioned in proximity to the feature; and
   generating a display signal that includes the sensed image data that registers within the second area of the display matrix to display a sensor-based image.

2. The method of claim 1, wherein identifying the feature comprises:
   evaluating the sensed image data to determine whether an anomaly is present within the field of view; and
   when the anomaly is present, identifying the anomaly as the feature.

3. The method of claim 1, wherein identifying the feature comprises:
   evaluating the sensed image data to determine whether the sensed image data indicates that an object within the field of view has a temperature that is outside of a given temperature range; and
   when the object has the temperature that is outside of the given temperature range, identifying the object as the feature.

4. The method of claim 1, wherein identifying the feature comprises:
   evaluating the sensed image data to determine whether the sensed image data indicates that an object within the field of view is moving; and
   when the object is moving, identifying the object as the feature.

5. The method of claim 1, wherein identifying the feature comprises:
   evaluating the sensed image data to determine whether the sensed image data indicates that an obstacle is present within the field of view; and
   when the obstacle is present, identifying the obstacle as the feature.

6. The method of claim 1, wherein identifying the feature comprises:
   evaluating additional data other than the sensed image data to determine whether the feature is present.

7. The method of claim 1, wherein determining the parameters defining the second area comprises:
   determining the parameters to define the second area as encompassing boundaries of the feature.

8. The method of claim 1, wherein determining the parameters defining the second area comprises:
   determining the parameters to define the second area to include an area that encompasses boundaries of the feature and an additional area extending a defined number of measurement units beyond the area that encompasses boundaries of the feature.

9. The method of claim 1, further comprising:
   displaying a sensor-based image defined by the information representing the sensed image data on a first portion of a display surface that corresponds to the second area of the display matrix.

10. The method of claim 9, further comprising:
    generating the display signal to include information representing a synthetic image of the external environment; and
    simultaneously displaying the sensor-based image and the synthetic image on the display surface.

11. The method of claim 9, wherein displaying the sensor-based image comprises:
    initially displaying the sensor-based image using initial image display characteristics that are adapted to draw attention of a viewer of the display surface to the second area; and
    subsequently displaying the sensor-based image using steady-state image display characteristics.

12. A method for displaying images of an external environment of an aircraft during flight, the method comprising the steps of:
    receiving sensed image data from an image sensor on board the aircraft, wherein the sensed image data represents detected electromagnetic energy from a field of view of the external environment of the aircraft, wherein the sensed image data registers within a first area of a display matrix;
    identifying a feature that registers within the first area of the display matrix based on feature data that is associated with a particular phase of flight;
    determining parameters defining a second area of the display matrix, wherein the second area is positioned within and is smaller than the first area, and the second area is positioned in proximity to the feature; and
    generating a display signal that includes the sensed image data that registers within the second area of the display matrix to display a sensor-based image.

13. The method of claim 12, wherein identifying the feature comprises:
    determining whether a runway is present within the field of view; and
    when the runway is present, identifying the runway as the feature.

14. The method of claim 12, wherein identifying the feature comprises:
    determining whether a symbol registers within the first area; and
    when the symbol registers within the first area, identifying the symbol as the feature.

15. The method of claim 14, wherein determining whether the symbol registers within the first area comprises determining whether a symbol selected from a group of symbols that includes a runway symbol, an extended runway centerline symbol, an obstacle symbol, an attitude indicator symbol, a horizon line symbol, and a flight path vector symbol, registers within the first area.

16. The method of claim 12, wherein identifying the feature comprises:

evaluating additional data other than the sensed image data to determine whether the feature is present, wherein the additional data includes data selected from a group that includes terrain data, synthetic image data, and navigation data.

17. The method of claim 12, further comprising:

displaying a sensor-based image defined by the information representing the sensed image data on a portion of a display surface that corresponds to the second area of the display matrix.

18. The method of claim 17, further comprising:

generating the display signal to include information representing a synthetic image of the external environment; and simultaneously displaying the sensor-based image and the synthetic image on the display surface.

19. A display system comprising:

an image sensor adapted to produce sensed image data based on detected electromagnetic energy from a field of view of an external environment; and a processing subsystem communicatively coupled with the image sensor, wherein the processing subsystem is adapted to receive sensed image data that represents the detected electromagnetic energy, wherein the sensed image data registers within a first area of a display matrix, to identify a feature that registers within the first area of the display matrix based on feature data that is associated with a particular phase of flight, to determine parameters defining a second area of the display matrix, wherein the second area is positioned within and is smaller than the first area, and the second area is positioned in proximity to the feature, and generate a display that includes the sensed image data that registers within the second area of the display matrix to display a sensor-based image.

20. The display system of claim 19, further comprising:

a display device communicatively coupled with the processing subsystem, wherein the display device is adapted to receive the display signal, and to display a sensor-based image represented by the display signal within a portion of the display device that corresponds to the second area of the display matrix.

21. The display system of claim 20, wherein the display device is a display device selected from a group of display devices that includes a primary flight display device, a multi-function display device, a near-to-eye display device, a head-up display device, an auxiliary display device, and a remote computer monitor.

22. The display system of claim 20:

wherein the processing subsystem is further adapted to generate the display signal to include information representing a synthetic image of the external environment; and wherein the display device is further adapted simultaneously to display the sensor-based image and the synthetic image.

23. The display system of claim 19, wherein the image sensor is a sensor selected from a group of sensors that includes a visible radiation sensing camera, an electro-optical device, an infrared radiation sensor, an ultraviolet light sensor, a light detection and ranging (LIDAR) device, and a radar device.

24. The display system of claim 19, wherein the system is adapted to be at least partially incorporated into a vehicle, and the vehicle is a vehicle selected from a group that includes an airplane, a helicopter, a gyroplane, a glider, a spacecraft, an unmanned mobile surveillance system, a motor vehicle, a ship, and a submarine.

25. The display system of claim 19, wherein the system is adapted to be at least partially incorporated into an apparatus selected from a group that includes binoculars, a weapon sight display system, an unmanned stationary surveillance system, a head-mounted display system, and a helmet-mounted display system.

* * * * *